United States Patent [19]
Richardson

[11] 3,797,678
[45] Mar. 19, 1974

[54] LOAD CARRIER AND TRANSFER CAR CONTROL

[75] Inventor: Raymond H. Richardson, Chicago, Ill.

[73] Assignee: Interlake, Inc., Chicago, Ill.

[22] Filed: Feb. 28, 1973

[21] Appl. No.: 336,885

[52] U.S. Cl.......... 214/16.4 B, 104/48, 191/12.2 R, 191/2
[51] Int. Cl............................................ B65g 1/06
[58] Field of Search............ 191/12, 12.2 R, 12.4, 2, 191/8, 3, 4, 1; 214/16.4 B; 104/48

[56] References Cited
UNITED STATES PATENTS

| 537,720 | 4/1895 | Samuel et al. | 104/48 |
| 2,997,048 | 8/1961 | Gertken et al. | 104/48 X |
| 1,879,713 | 9/1932 | Scott | 214/16.1 DB |
| 2,964,876 | 12/1960 | Bonanno | 191/12.2 R |

FOREIGN PATENTS OR APPLICATIONS

| 409,864 | 3/1910 | France | 104/48 |
| 414,386 | 3/1910 | France | 214/516 |
| 869,496 | 3/1953 | Germany | 104/48 |
| 466,139 | 1/1969 | Switzerland | 214/16.4 B |

Primary Examiner—Gerald M. Forlenza
Assistant Examiner—R. B. Johnson
Attorney, Agent, or Firm—Molinare, Allegretti, Newitt & Witcoff

[57] ABSTRACT

In a storage installation, an electrical connector couples the controller of the load carrier to the transfer car drive means and the controller on the load carrier operates the load carrier drive motor and also the transfer car drive motor, the latter being operated when the load carrier is positioned for transport by the transfer car and the connectors are coupled. The load carrier is elevated above the storage installation floor during transport by way of a downwardly inclined ramp which minimizes the elevation power requirements.

10 Claims, 7 Drawing Figures

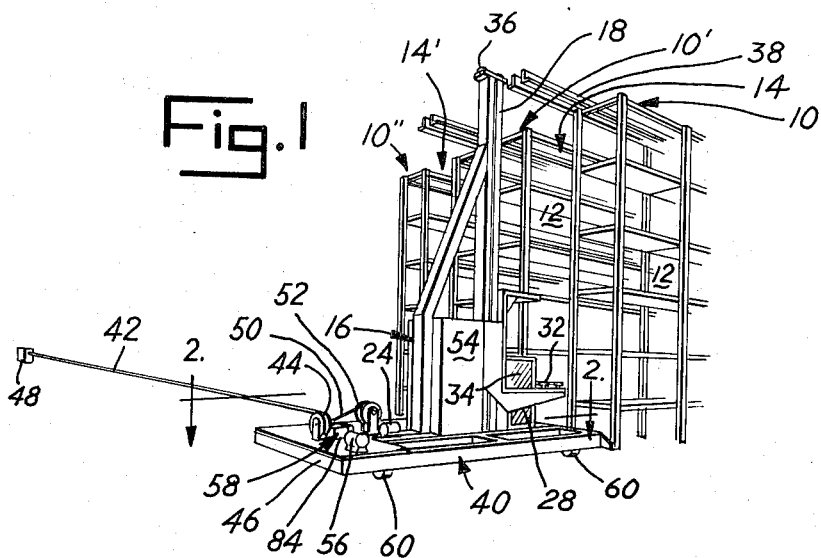
Fig. 1
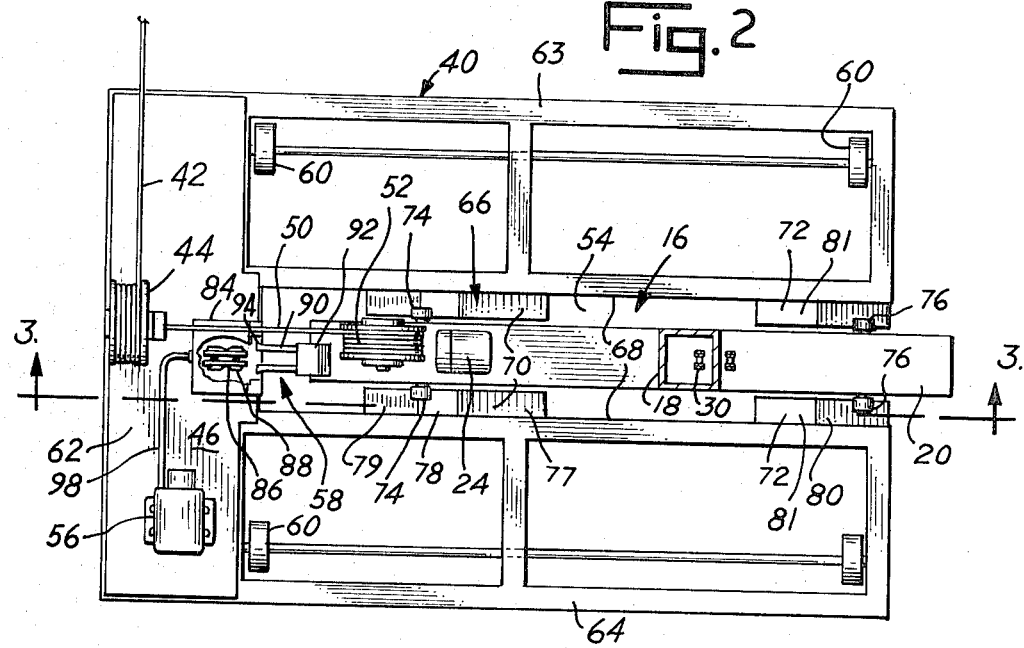
Fig. 2
Fig. 3

LOAD CARRIER AND TRANSFER CAR CONTROL

BACKGROUND AND SUMMARY OF THE INVENTION

This invention relates to a multivehicle arrangement and, more particularly, to an improved load carrier and transfer car construction for use in a storage installation.

In mechanized storage and retrieval installations, a load carrier vehicle is frequently provided for operation in one or more aisles between the storage frames of the installation for the handling of articles which are to be stored in and retrieved from the frames. Particularly where the load carrier is a large and rather expensive vehicle, a transfer car or other storage mechanism is also frequently provided for transferring the load carrier between several different aisles for operation alternatively in these aisles. In such installations a pair of controller panels and separate electrical circuitry is generally provided, one on the load carrier for controlling the functions of the load carrier during operation and one on the transfer car for controlling the propulsion of the transfer car during transfer of the load carrier between the aisles. Such separate controllers increase the expense of the installation and consume space, since mounting space must be provided on the respective vehicles for the mounting of the respective controllers. Moreover, in installations where article conveyors are also mounted on the transfer car, little if any space remains on the transfer car for its controller. In addition, it is generally necessary, where the operator of the load carrier operates the load carrier from the lift platform, for the operator to dismount from his operator's position on the lift platform in order to manipulate the controls on the transfer car during transfer of the load carrier between the aisles. Thus, in the prior dual controller constructions, substantial operator time and effort is wasted, as well as down time of the system during load carrier transfer.

In the multivehicle arrangement constructed in accordance with the principles of the present invention, only one controller need be provided which need be no larger than any one of the controller housings previously employed in the dual controller system. Since only one controller housing is necessary, the size of at least one of the vehicles may be substantially reduced and the expense of this system and lost space also substantially reduced. In the arrangement incorporating the principles of the invention, only one controller need be provided for both the operation of the load carrier and the operation of the transfer car and this controller may be located on the load carrier where it is readily accessible to the system operator and without the need for the operator to dismount from the operator's cage when it is desired to transfer the load carrier between aisles. Thereby, lost time and effort is substantially minimized during transfer of the load carrier. Moreover, in an arrangement incorporating the principles of the invention, operation of both the load carrier as well as the transfer car may be accomplished by way of a single control handle. In addition, since the controller housing of the present invention contains both the load carrier and the transfer car controls, circuitry duplication is minimized and suitable switching circuits may be readily provided which automatically prevent movement of the load carrier while the transfer car is being driven between the aisles to transfer the load carrier and which also automatically prevent movement of the transfer car until the load carrier has been fully positioned for transfer. In an arrangement incorporating the principles of the present invention, a simple sturdy coupling member couples the load carrier to the transfer car to transmit power from the load carrier to the transfer car drive motor automatically when the load carrier has been positioned for transfer by the transfer car.

In a principal aspect of the present invention, a multivehicle arrangement includes a first vehicle and a second vehicle which is adapted to transport the first vehicle and first and second drive means for propelling the first and second vehicles, respectively. Power transmission means couples the first drive means to the a source of power and coupling means couples the first and second vehicles together automatically when the first vehicle is positioned for transport by the second vehicle. Switching means cooperates with the coupling means for transferring the power from the first drive means to the second drive means when the first vehicle is positioned for transport on the second vehicle.

In another principal aspect of the present invention, the coupling means electrically couples the first vehicle to the second vehicle to transmit power from the first vehicle to the second vehicle.

In another principal aspect of the present invention, the first vehicle comprises a load carrier of a storage system and the second vehicle comprises a transfer car for transferring the load carrier between the aisles of the system.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a perspective view of a preferred embodiment of article storage and retrieval system incorporating the principles of the present invention;

FIG. 2 is a plan view of a preferred embodiment of transfer car and load carrier of the storage and retrieval system of the present invention as viewed substantially along line 2 — 2 of FIG. 1;

FIG. 3 is a cross-sectioned elevation view of the transfer car and load carrier as viewed substantially along line 3 — 3 of FIG. 2;

DESCRIPTION OF THE PREFERRED EMBODIMENT

Figure 4:
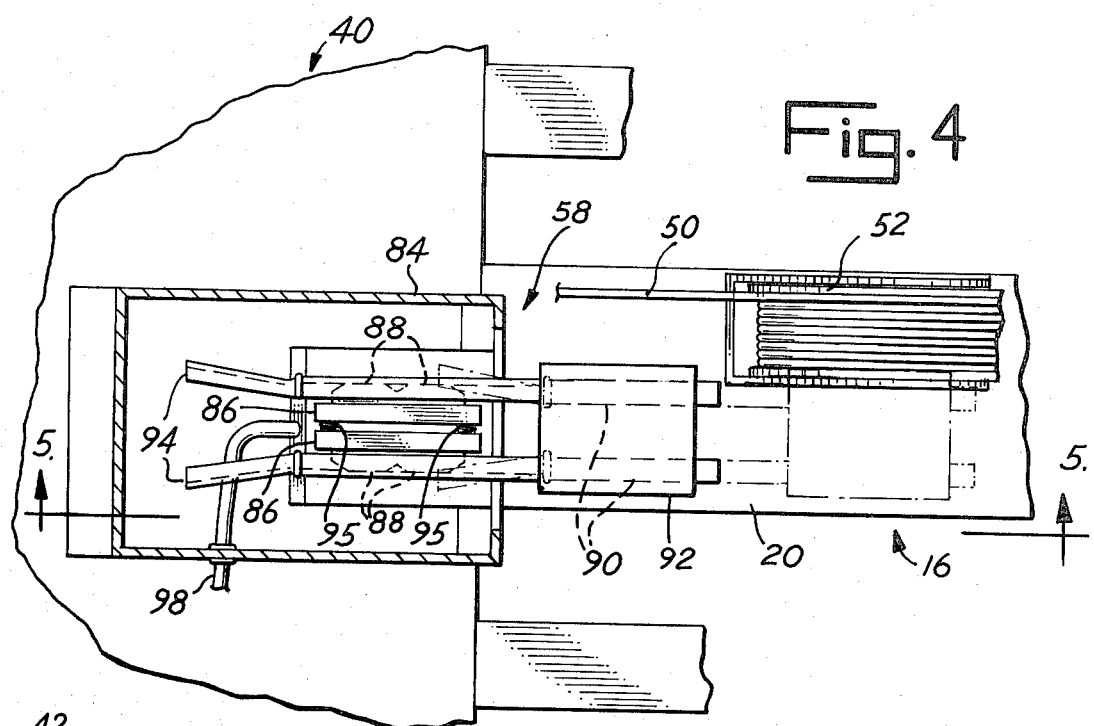
FIG. 4 is a cross-sectioned plan view of the power coupling between the transfer car and load carrier as viewed substantially along line 4—4 of FIG. 3.

Referring particularly to FIG. 1, a multivehicle arrangement incorporating the principles of the present invention is shown in which the arrangement is embodied in a storage and retrieval installation of a mechanized storage system. Such storage and retrieval system, in general, includes a plurality of spaced storage frames 10, 10' and 10" having a plurality of suitable storage bins 12 spaced both vertically and horizontally of each other for receiving and holding the articles which are to be stored in and retrieved from the system. The respective storage frames are spaced from each other so as to define aisles 14 and 14' therebetween in which a suitable load carrier vehicle 16 is adapted to longitudinally move up and down aisles 14 or 14' for the insertion and removal of desired articles into and from the bins. It will be understood that although three storage frames and two aisles are shown, the system may and usually does include more aisles and frames than those shown.

The load carrier 16 preferably includes a vertically extending mast 18 which extends upward from a suitable support bed 20 as shown in FIGS. 2 and 3. The load carrier is adapted to be drivingly supported upon wheels or tires 22 and 23 for movement upon the floors of the aisles 14 or 14'. At least one set of these wheels is preferably powered by a suitable drive motor 24 by way of a drive chain or gear box (not shown).

The load carrier 16 also includes a typical elevatable lift platform 28 which is adapted to move up and down the mast 18 by way of hoist chains 30 as shown in FIG. 2, such that transversely extendible article handling forks 32 or other suitable article handling means may be positioned in elevation adjacent the bin 12 in which it is desired to store or retrieve a given article and the forks 32 may be inserted into the bins. An operator's cage 34 is also mounted on or in association with the lift platform 28 in which an operator may position himself to operate the load carrier.

Suitable guide means is preferably provided for guiding the load carrier 16 for movement in the aisles 14 and 14'. As shown in FIG. 1, such guide means may include, for example, rollers 36 which are positioned adjacent the upper end of the mast 18 of the load carrier and which engage an overhead guide rail 38 to guide the movement of and steady the load carrier in the aisles 14 and 14' of the storage frames during article handling operations.

The storage and retrieval installation of the present invention also includes a floor running transfer car or vehicle 40 which is adapted to move transversely of the aisles 14 and 14' upon the floor of the storage space adjacent the ends of the aisles. Transfer car 40 supportably receives the load carrier 16 thereon as shown in FIG. 3, such that when the load carrier is positioned upon the transfer car for transfer, the transfer car and load carrier may be moved transversely of the aisles 14 and 14' to enable the load carrier to operate in more than one given aisle. If necessary, a superstructure (not shown) may be provided on the transfer car 40 which cooperates with the rollers 36 at the top of mast 18 to steady the load carrier during transfer.

As shown particularly in FIGS. 1–3, a suitable flexible power transmission conductor or cable 42 is carried on a reel 44 mounted at the rear end of the transfer car bed 46. One end of conductor 42 is connected to a suitable source of power 48, preferably electrical, and the reel is rotatable so as to maintain the conductor taut at all times. Another flexible power transmission conductor 50 is carried upon a reel 52 which is also rotatably mounted, but on the bed 20 of the load carrier 16. Power from conductor reel 52 is conducted to the controller housing 54 of the load carrier and its associated circuitry shown in FIGS. 6 and 7, from where it is either distributed to the load carrier drive motor 24/1MTR, the hoist and the fork drive motors 3MTR and 4MTR or, in the alternative, to the transfer car drive motor 56/2MTR via a power transmission coupling 58 between the transfer car and the load carrier, as will be explained in more detail hereafter. In turn, motor 56/2MTR is mechanically coupled to the transfer car drive wheels 60, whereby when the motor 56/2MTR is energized, the transfer car 40 will be propelled across the ends of the aisles 14 and 14'.

Referring particularly to FIGS. 2 and 3, the transfer car bed 46 is generally U-shaped and comprises a horizontal machinery deck 62 and a pair of spaced support structures 63 and 64 upon which conveyors (not shown) may be supported for feeding articles to and removing articles from the forks 32 of the load carrier lift platform. Thus, the conveyors, if present, may be transported along with the load carrier. The support structures 63 and 64 are spaced from each other so as to define a slotted berth 66 therebetween for receipt of the load carrier 16 for transfer. Attached to the inside of the beams 68 defining the transfer car berth 66 are two pairs of inclined support ramps 70 and 72, the rear pair of ramps 70 being higher in elevation than the front pair of ramps 72. Extending from the opposite sides of the load carrier bed 20 are a plurality of rollers, the pair of rear rollers 74 being elevated above the front rollers 76 and being spaced in the horizontal from each other similarily to the spacing of the inclined support ramps 70 and 72. As shown in FIG. 3, both of the rear support ramps 70 include an upward inclined surface 77, a flat surface 78, and a downward inclined surface 79, and the front support ramps 72 include an upward inclined surface 80 and a flat surface 81. The spacing of these respective ramp surfaces and the rollers 74 and 76 is such that when the rear rollers 74 are commencing to move down the downward inclined surface 79 of the rear ramps 70, the front rollers 76 are just beginning to ride upward along the upward inclined surface 80 of the front ramps 72 as shown in solid in FIG. 3. Such relationship assists in elevating the front end of the load carrier above the floor 82 in a manner which minimizes the power required to perform such elevation, the front end of the load carrier generally being heaviest since it bears the weight of the lift platform 28 and operator's cage 34.

Figure 5:
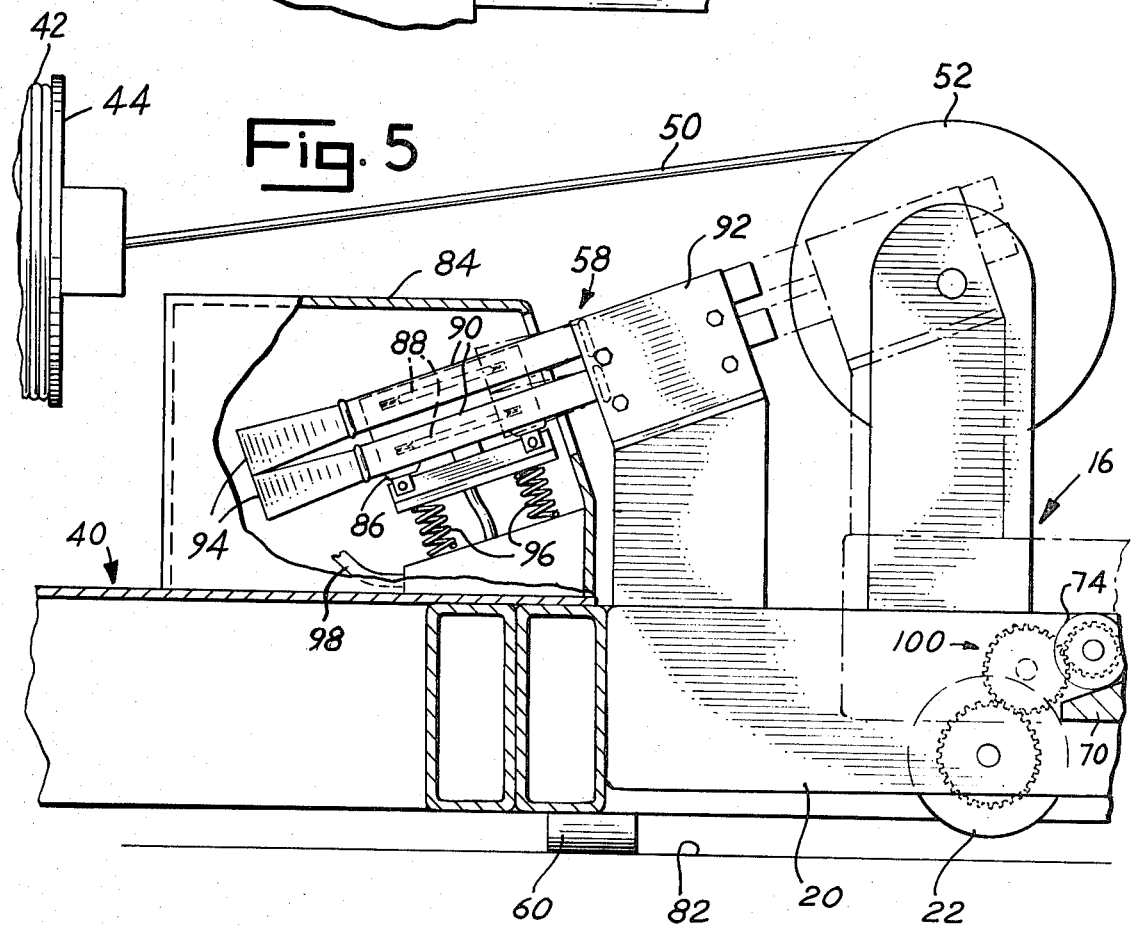
FIG. 5 is a cross-sectioned elevation view of the power coupling as viewed substantially along line 5 — 5 of FIG. 4.

Referring particularly to FIGS. 3–5, the coupling 58 of the present invention couples the load carrier power transmission conductor 50, via the controller housing 54, to the transfer car drive motor 56/2MTR. The coupling 58 preferably comprises a receptacle housing 84 mounted at the rear of the transfer car berth 66 preferably on machinery deck 62 of the transfer car 40. Inside the housing 84 are positioned a plurality of insulative collector plates 86 having conductive contact shoes 88 mounted thereon as best shown in FIGS. 4 and 5. The contact shoes 88 are each adapted to fit into one of several slotted metal conductor guideways 90 which are mounted by suitable rigid supports 92 so as to extend from the rear of the load carrier for insertion into housing 84 and into contact with shoes 88. The leading end of each of the conductor guideways 90 is preferably flared or horn shaped at 94 so as to assist in the alignment, insertion and mating of the guideways 90 into contact with the contact shoes 88 in the receptacle housing. In addition, to facilitate alignment, insertion and mating of the coupling 58, collector plates 86 are preferably spring mounted on springs 95 as shown in FIG. 4 to allow transverse movement of the plates relative to each other and the entire collector plate assembly is spring mounted by springs 96 as shown in FIG. 5 so as to allow up and down movement of the plates.

Both the contact shoes 88 and the guideways 90 are inclined relative to the horizontal at an angle substantially equal to the angle of the inclination of the downward inclined ramp surface 79, so that as the load carrier begins to move down the incline, smooth insertion of the slotted guideways 90 into mating relationship with the contact shoes 88 will occur. The contact shoes 88, in turn, are electrically connected to the drive motor 56/2MTR of the transfer car by a conductor 98 such that when the coupling 58 is made and power is transmitted through the coupling, the drive motor of the transfer car is energized to propel the transfer car.

Figure 6:
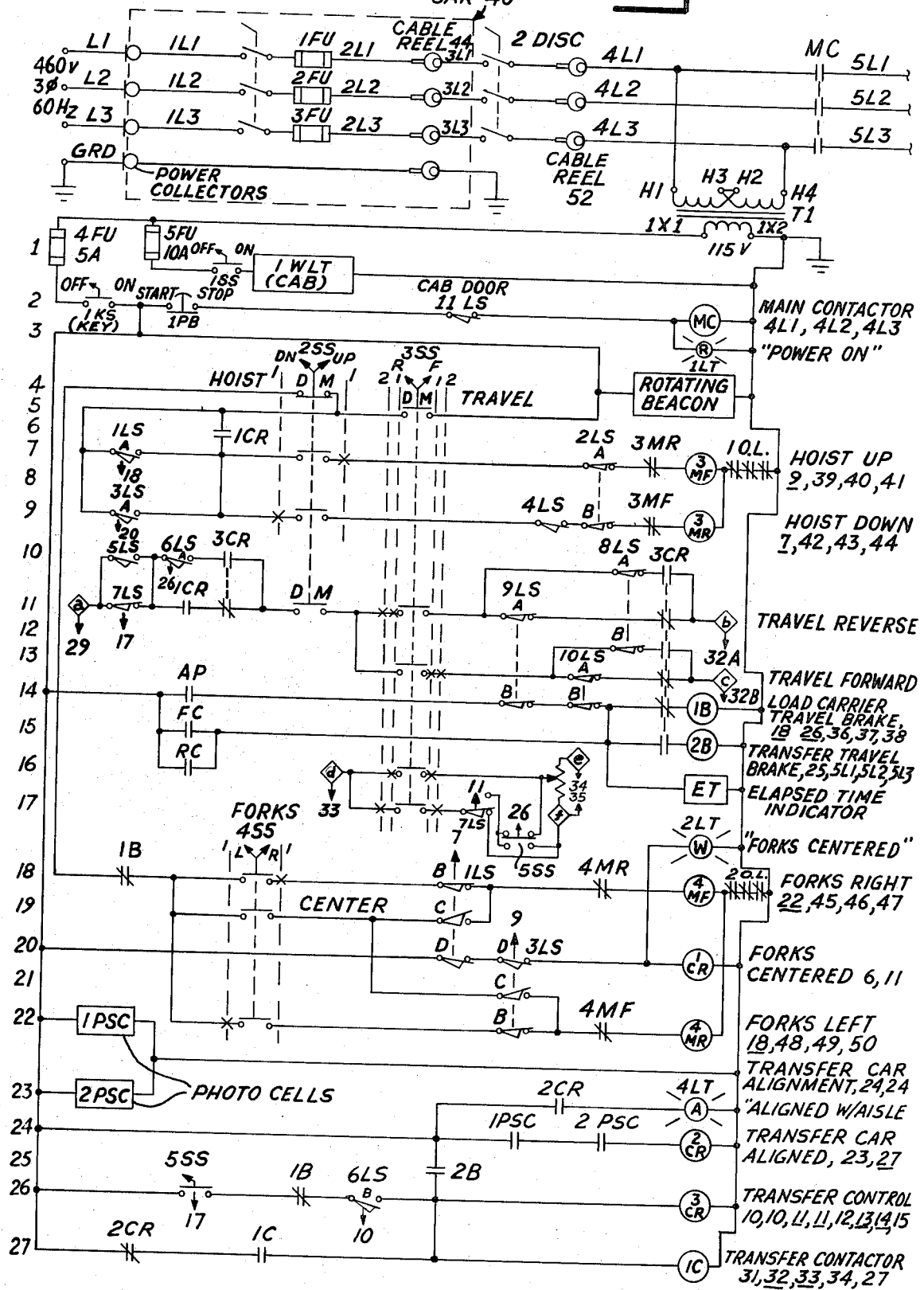
FIGS. 6 and 7 are schematic electrical circuit diagrams of a suitable controller circuit of the present invention.
Figure 7:
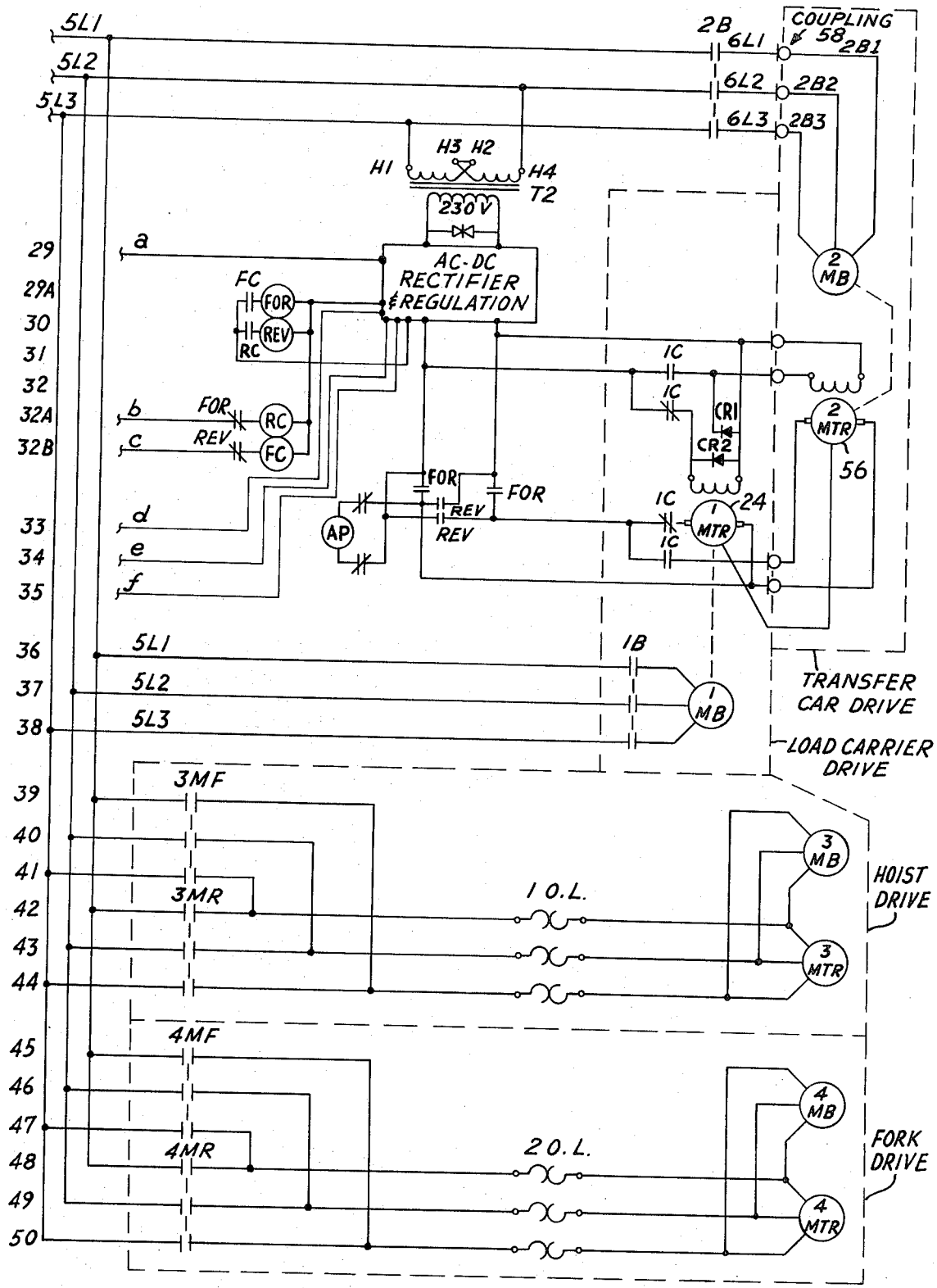

Referring to FIGS. 6 and 7 a suitable schematic electric circuit diagram is shown for controlling the system operations. Both of the circuits in FIGS. 6 and 7 are contained in the single controller housing 56 and have been separated in the drawings only due to lack of adequate space in a given drawing sheet to depict both figures on the same sheet. The operation and components of the circuit diagram should be clear to one skilled in the art, since the diagrams are depicted in conventional relay circuit nomenclature. Thus, the diagram will not be explained in detail, except to briefly call attention to some of the more important components and operating functions of the circuits as they relate to the present invention.

In FIGS. 6 and 7, the 460 volt, three phase main power conductors are designated by "L," e.g. L1, 1L1, 2L1, etc. A first control circuit at 115 v. is tapped from power leads 4L1 and 4L3 as shown in FIG. 6 and a second control circuit at 230 v. is tapped from power leads 5L2 and 5L3 as shown in FIG. 7. The voltage of these circuits is stepped down by transformers T1 and T2 respectively.

The circuit as shown in FIGS. 6 and 7 is a relay circuit as will be appreciated by the standard relay convention depicted. Switch 2SS is controlled by the hoist control handle, switch 3SS the travel control handle and switch 4SS the fork control handle. It will be seen that depending on the position of switch 5SS, the switch 3SS and its operating handle will either operate the load carrier drive motor 24/1MTR or the transfer car drive motor 56/2MTR, and the latter only if the coupling 58 is also complete as shown in FIG. 7.

Referring again to FIG. 6, when the control handles of switches 2SS, 3SS and 4SS are operated, only one of the switches shown as ganged thereto will operate, e.g., to elevate the hoist the 2SS switch in line 7 is closed and the 2SS switch in line 9 is open. The "DM" switches, for example the 2SS switch in lines 4 and 11, are "deadman" pushbutton switches, the pushbuttons of which are located in the control handles of the respective switches. These "DM" switches normally assume the position shown in FIG. 6, unless the pushbutton is held down by the load carrier operator. Accordingly, both hands of the operator must be on the control handles of switches 2SS and 3SS, for example, before the load carrier can be moved in the aisle either in forward or reverse. These "deadman" switches therefore act as safety switches which prevent injury to the operator during operation of the load carrier.

In FIG. 6 legends are placed next to the several lines. These legends indicate the purpose of the line and also set forth the other lines in which relay switches are present which must be opened or closed to perform the stated function. In addition, the condition of the relay switches in each of these other lines is indicated by underscoring or not underscoring the line number in the legend. For example, the legend at the right end of line 7 states "HOIST UP 9, 39, 40, 41." This means that to elevate the hoist, in addition to the switch 3MR in line 7 being closed as shown, the relay switch 3MF in line 9 is opened and the relay switches 3MF in lines 39, 40 and 41 are closed.

It will be seen when considering FIGS. 6 and 7 together, that not only are the main power lines 5L1, 5L2 and 5L3 coupled together, but also a portion of the circuitry shown in the respective figures are coupled at terminals a–f. Referring to line 11 in FIG. 6, for example, the line is coupled at terminals a and b in lines 29 and 32A, respectively, in FIG. 7.

Again referring to FIG. 6, it will be seen that numerous limit switches "LS" are shown for preventing accidental damage to the storage installation components, the articles handled in the system and the operator personnel. Some of these limit switches and their functions include:

1LS-A, Closes when forks extended full right.
1Ls-B, Opens when forks extended full right.
1Ls-C, Closes when forks extended to full left.
1LS-D, Opens when forks extended to full left.
2LS-A, Opens when hoist is at extreme up position.
2LS-B, Opens when hoist is at extreme down position.
3LS-A, Closes when forks extended full left.
3LS-B, Opens when forks extended full left.
3LS-C, Closes when forks extended to full right.
3LS-D, Opens when forks extended to full right.
4LS, Opens if hoist chain 30 becomes slack.
5LS, Opens if carriage at low position.
6LS-A, Opens if load carrier is on transfer car.
6LS-B, Closes if load carrier is on transfer car.
7LS, Opens if load carrier approaches end of aisle for slowdown.
8LS, Opens as transfer car approaches end of travel limits.
9LS, Opens as load carrier approaches end of travel limits – rev.
10LS, Opens as load carrier approaches end of travel limits – fwd.
11LS, Opens when cab door is open.

Finally, referring to FIG. 7 each of the transfer car drive circuit, load carrier drive circuit, hoist drive circuit and fork drive circuit have been enclosed within dotted lines and appropriate legends supplied. In FIG. 7, the components designated "MB" are motor brakes which are automatically set when their corresponding motor "MTR" is not energized and are released when the motor is energized.

The operation of the preferred embodiment of the present invention which has thus far been described is as follows:

Initially it will be assumed that the load carrier 16 has been operating in one of the given aisles 14 and it is now desired to transfer the load carrier to another of the aisles 14' for operation. The transfer car 40 is first positioned at the end of the aisle 14 in which the load carrier is presently located such that the berth 66 of the transfer car is aligned with the aisle 14. Referring now particularly to FIGS. 3, and 6–7, the load carrier is operated under its own power through switch 3SS by way of motor 24/1MB, electrical power being supplied through the conductor 42 on reel 44, the conductor 50 on reel 52, and through the drive circuit shown in FIGS. 6 and 7. Thereby, the wheels 22 and/or 23 of the load carrier drive the load carrier 16 horizontally in the aisle 14 on the floor of the aisle and into the berth 66 of the transfer car 40.

As the load carrier 16 backs into the berth, the rear rollers 74 will pass over the lower inclined support ramp 72 and will continue to move longitudinally into the berth 66 until these rollers 74 come into contact with the upward inclined surface 77 of the support ramp. Since these rollers are also powered by way of the gear train 100 from the principle load carrier drive train as shown in FIG. 5, these rollers 74 will ride up the upward inclined surface 77 of the support ramp 70 and drivingly elevate the rear end of the load carrier upward to lift its drive wheels 22 above the floor as shown in FIG. 3.

Rollers 74 continue to drive the load carrier into the berth 66 by riding up the inclined surface 77 and across the flat 78 of the support ramps 70. When the rollers 74 have reached the end of the flat 78, as shown in solid in FIG. 3, the other front rollers 76 will just come into contact with the upward inclined surface 80 of the front support ramp 72. At this point, elevation of the substantially heavier front end of the load carrier is accomplished by rollers 76 riding up the inclined surface. It will be seen that the power needed to elevate the substantially heavier front end of the load carrier is minimized and elevation of the front end is assisted by way of the downward inclined surface 79 of ramps 70, since the rollers 74 will roll down the inclined surface 79 and thereby gravitationally assist in further backing the load carrier into the berth and drawing the rollers 76 up their inclined surfaces 80.

When rollers 74 commence their downward travel down the downward inclined surfaces 79, the pickup horns 94 of the conductor guideways 90 will come into contact with the contact shoes 88 in the receptacle 84. Since the shoes 88 and guideways 90 are inclined similarly to the incline 79, insertion of the guide ways will be smooth. When the load carrier has been fully positioned in the berth 66 for transfer by the transfer car 40, the drive rollers 74 and 76 will be positioned on the ramps 70 and 72 as shown in dot and dash in FIG. 3 and the guideways will be fully inserted into contact with the contact shoes as shown in FIGS. 4 and 5. Thus, not only is the coupling 58 between the controller of the load carrier made with the transfer car drive motor 56/2MTR, but also the primary drive wheels 22 and 23 of the floor running load carrier will be elevated above the floor surface 82.

Once the load carrier has been fully positioned for transfer on the transfer car, the operator, by throwing switch 5SS, as shown in FIG. 6, from the operator's cage 34 will cut out the load carrier drive motor 24/1MB and cut in the transfer car drive motor 56/2MTR and by operating the same handle that was employed to control the load carrier travel switch 3SS and utilizing much the same circuitry and safety features as was used to control load carrier travel the operator can control move-ment of the transfer car 40 across the ends of aisles 14 and 14'.

Once the berth 66 of the transfer car in which the load carrier is supported has been driven to and aligned with the aisles 14' in which it is now desired to operate the load carrier, the transfer car drive motor 56/2MTR is deenergized by operation of switch 3SS and switch 5SS is thrown again by the operator without dismounting from the operator cage 34. Operation of the control handle for switch 3SS will now energize the load carrier motor 24/1MTR. The rollers 74 will roll up the inclined surface as the rollers 76, assisted by gravity, roll down the inclined surface 80 and when the load carrier wheels 22 and 23 are again positioned on the floor 82, the load carrier will continue to move forward out of the berth and into the aisle 14' in which it is to now operate.

It should be understood that the embodiment of the present invention which has been described is merely illustrative of one of the applications of the principles of the invention. Numerous modifications may be made by those skilled in the art without departing from the true spirit and scope of the invention.

What is claimed is:

1. In a multivehicle arrangement including a first vehicle and a second vehicle adapted to transport the first vehicle, comprising
    first and second drive means for propelling said first and second vehicles respectively,
    extending from said power source to said second vehicle and connecting power transmission means a source of power spaced from said vehicles, said first drive means to said source of power to propel said first vehicle relative to said second vehicle,
    power coupling means mounted on said vehicles coupling said first and second vehicles together automatically when said first vehicle is positioned for transport by said second vehicle, and
    switching means cooperating with said power coupling means for transferring power from said first drive means through said coupling means to said second drive means for propelling said second vehicle when said first vehicle is positioned for transport on said second vehicle.

2. In the arrangement of claim 1 wherein said power transmission means is electrical and said coupling means comprises an electrical connector.

3. In the arrangement of claim 1 wherein said power transmission means is electrical and said switching means is on said first vehicle.

4. In the arrangement of claim 3 wherein said switching means transfer the power from the power transmission means on said first vehicle to said second drive means through said coupling means.

5. In the arrangement of claim 1 wherein said coupling means comprises a fixed receptacle on said second vehicle and a movable connector on said first vehicle, said connector being automatically inserted in said receptacle as said first vehicle is being positioned for transport on said second vehicle.

6. In the arrangement of claim 1 wherein said power transmission means is electrical, said coupling means comprises an electrical connector and said switching means is on said first vehicle, said switching means transferring the power from said transmission means on said first vehicle to said second drive means through said coupling means when said first vehicle is positioned for transport by said second vehicle.

7. In the arrangement of claim 1 wherein said first vehicle is an article handling load carrier of a mechanized storage system and said second vehicle is a transfer car for transferring said load carrier between the aisles of the storage system.

8. In the arrangement of claim 7 wherein said first drive means propels said load carrier longitudinally in the aisles of the storage system, and wherein said load carrier includes hoist drive means for hoisting the articles, and transverse drive means for moving the articles transversely of the load carrier, and controller means on said load carrier for controlling said first, hoist and transverse drive means and for shifting power to said second drive means through said coupling means when said load carrier is positioned for transport by said transfer car to propel said transfer car.

9. In the arrangement of claim 8 wherein said power transmission means is electrical and said coupling means is an electrical connector.

10. In the arrangement of claim 8 wherein said controller means deactivates said first drive means when said second drive means is activated and vice versa.

* * * * *

UNITED STATES PATENT OFFICE
CERTIFICATE OF CORRECTION

PATENT NO. : 3,797,678
DATED : March 19, 1974
INVENTOR(S) : RAYMOND H. RICHARDSON It is certified that error appears in the above-identified patent and that said Letters Patent are hereby corrected as shown below:

Claim 1 should read as follows:

In a multivehicle arrangement including a first vehicle and a second vehicle adapted to transport the first vehicle, comprising first and second drive means for propelling said first and second vehicles respectively, a source of power spaced from said vehicles, power transmission means extending from said power source to said second vehicle and connecting said first drive means to said source of power to propel said first vehicle relative to said second vehicle, power coupling means mounted on said vehicles coupling said first and second vehicles together automatically when said first vehicle is positioned for transport by said second vehicle, and switching means cooperating with said power coupling means for transferring power from said first drive means through said coupling means to said second drive means for propelling said second vehicle when said first vehicle is positioned for transport on said second vehicle.

Column 6, line 9 should read as follows:

-- 7 states "HOIST UP 9, 39, 40, 41". This means that to --

Signed and Sealed this twenty-third Day of December 1975

[SEAL]

Attest:

RUTH C. MASON
Attesting Officer

C. MARSHALL DANN
Commissioner of Patents and Trademarks